(No Model.)
S. W. ARNOLD & W. C. CRANMER.
UNDERGROUND WAY OR CONDUIT.
No. 366,195. Patented July 12, 1887.
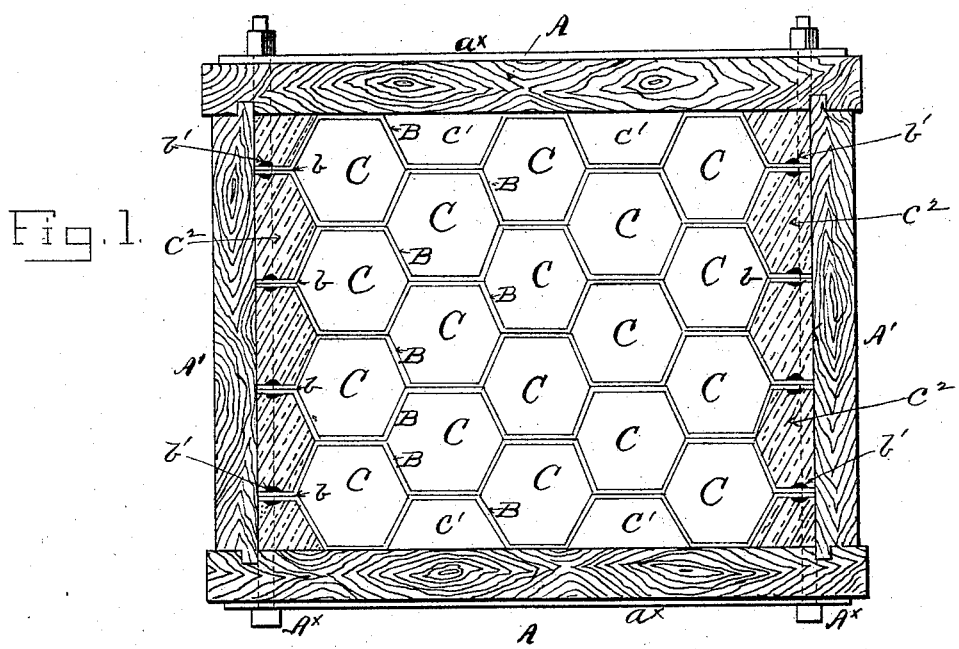
Fig. 1.
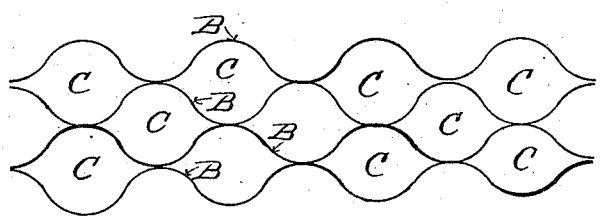
Fig. II.
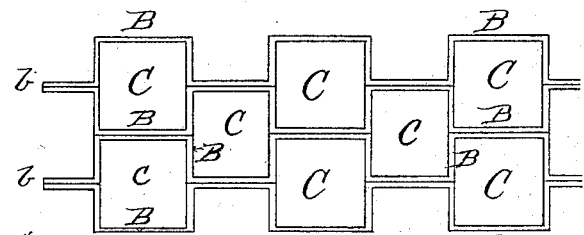
Fig. III.
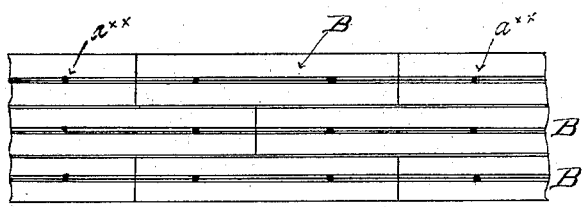
Fig. IV.
Witnesses
H. J. Lambert
Burton C. Thatford
Inventors
Sydney W. Arnold
William C. Cranmer
By their Attorney Thomas D. Mowlds

UNITED STATES PATENT OFFICE.

SYDNEY WM. ARNOLD AND WILLIAM C. CRANMER, OF PHILADELPHIA, PENNSYLVANIA.

UNDERGROUND WAY OR CONDUIT.

SPECIFICATION forming part of Letters Patent No. 366,195, dated July 12, 1887.

Application filed March 7, 1887. Serial No. 229,919. (No model.)

*To all whom it may concern:*

Be it known that we, SYDNEY WM. ARNOLD, a citizen of Great Britain, and WILLIAM C. CRANMER, a citizen of the United States, both residing at Philadelphia, in the county of Philadelphia and State of Pennsylvania, have invented certain new and useful Improvements in Underground Ways or Conduits; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to underground ways or conduits for running lines of electric or other wires or pipes for the various purposes for which such wires or pipes are used—as, for instance, telegraph, telephone, electric light, signal, gas, &c.

The object of the invention is to produce compact conduits which shall in the smallest amount of space carry the greatest number of wires or pipes and at the same time keep each one separate from every other.

In carrying our invention into practice, we employ plates or sheets of metal or other suitable material, which are corrugated and placed alternately back to back, so that when a series of such plates are laid in a suitable channel or trough they shall present in cross-section a honey-comb appearance, and all the space occupied by said plates shall be available for laying wires, except along the edges, where partial pockets or openings are made, which we prefer to fill with pitch. The edges of each two or pair of plates are bolted or riveted together, and may be taken up together or singly by removing said bolts or rivets. The corrugated plates are preferably laid in a case or trough of wood composed of planks or strips whose edges are mortised together, and tie-rods are employed to firmly and securely unite the walls of the trough or case. These tie-rods are preferably set just inside of the side walls of the trough and are let into notches in the edges of the fluted or corrugated plates, and serve to stiffen and hold said plates longitudinally. The plates are also preferably laid so as to break joints longitudinally, which will also serve to preserve their fixed longitudinal position and strengthen the structure, and in case the trough or case tends to settle at any point will preserve the horizontal integrity of the conduit; but it is not essential to the main object of the invention that the joints should thus be set at all or any part of the length of the conduit, as we may set the joints of the several plates in the same vertical line throughout, or at such points as seem to require the breakage or change of joints in the several plates we may so set them, while the general length of the conduit will be laid with the joints of the plates vertically matched. The form or shape of the flutes or corrugations in the plates may be varied, the object being to produce a series of longitudinal cells or passages separated from each other by the walls of the fluted or corrugated plates without any useless thickness of body, as has heretofore been done where grooves have been made on both sides of a thick body of material. Therefore the corrugations may have flat or rounded bottoms, and vertical, sloping, or curved sides, as may be desired, the purpose of our invention being fulfilled in any form where each or both sides of the corrugations are employed or utilized in forming walls for separate passages or longitudinal cells.

The invention will be more fully understood from the following detailed description.

The accompanying drawings illustrate what we consider the best means for carrying our invention into practice.

Figure I is an end view of the conduit, showing the trough or case and the fluted or corrugated plates of the form shown. Figs. II and III are views of different or modified forms of flutes or corrugations. Fig. IV is a side elevation of several pairs of plates, showing the manner of laying them to break joints longitudinally.

Similar letters of reference indicate corresponding parts in all the figures where they occur.

A and A' represent the walls of the trough or case. A are the bottom and top portions or walls, and A' are the side portions or walls. These walls are preferably united by extending the walls A A over or past the walls A' A' and forming grooves in parts A A, into which the whole or a part of the thickness of the walls A' A' project. The joints between parts A A and A' A' may be pitched or otherwise cemented or made water-tight. Tie-rods $A^\times A^\times$ are run from and through plates A A just inside of the walls or plates A' A', which serve to keep the parts of the trough firmly and reliably united and at the same time perform an additional function by reason of their position inside of the side walls, which will presently appear. Bars or cross-plates $a^\times a^\times$ may be provided below and above walls A A, as shown, through which the tie-rods pass. When these bars $a^\times a^\times$ are used, it will be seen that a complete compress is formed for the case or trough, which will prevent the walls from splitting and warping.

B B are the fluted or corrugated plates or sheets. These plates are formed in such manner that they shall present half cells or passages on each side alternately, only divided by the thickness of the fluted or corrugated material; and they are laid together in such manner as to make these half cells or passages match and form inclosed and separate cells or passages lying close to each other but entirely separated from each other by the fluted or corrugated walls of the plates. It will be obvious that great economy of space is secured by this arrangement and that the entire area of the trough may be utilized except what is actually occupied by the thickness of the thin corrugated plates, and some partial cells or passages along the sides which we prefer to fill with pitch, so that a small conduit will afford capacity for laying a great number of wires, as none of its area is occupied by needless thicknesses of division-walls or imperfectly utilized space. The edges of each pair or couple of plates which meet, as shown at $b$, are united by rivets or bolts $b'$, and the entire series are held longitudinally by having the tie-rods $A^\times A^\times$ run through notches or indentations $a^{\times\times}$ in the edges of the several plates.

Along the top and bottom of the trough or case half cells or passages are necessarily formed, as are seen at $c'$, while the full passages or cells marked C lie between and are completely surrounded by the corrugated or fluted plates. Both the full and the partial or half cells and passages may be utilized in laying wires. Along the sides of the case partial cells are also formed, which are preferably filled with pitch, as shown at $c^2$. This pitch not only tends to unite or bind the pairs of plates together, but also cements the joint between the pairs of plates, which joint might otherwise admit moisture to the wires contained in the cells or passages formed between the backs of the two adjacent pairs of plates.

The corrugations or flutes in the plates may be angular, as shown in Figs. I and III, or curved, as shown in Fig. II. We have shown two shapes or forms of the angular construction—one with sloping sides, in Fig. I, and another with perpendicular and parallel sides, in Fig. III. From the changes of form thus illustrated it will be evident that the shape of the flutes or corrugations and the resulting shape of the cells or passages may be varied to any desired extent without departing from the scope of the invention.

In laying the plates or sheets, we may lay them in regular vertical tiers, so that their ends shall match throughout the entire series; or we may lay them so as to break joints, as shown in Fig. IV; and we prefer this manner of laying them, as it serves to give strength to the structure and prevents sagging and relieves the strain upon the trough or case. It will be understood, of course, that we do not desire to be confined to the precise or approximate form of the trough or case, as it is evident that any form may be used in which the plates may be laid.

Having thus described our invention, what we claim, and desire to secure by Letters Patent, is—

1. A conveyer or conduit for wires or pipes, consisting of plates or sheets of metal or analogous material bent or struck up to form alternating corrugations on the opposite sides, so that the corrugations on each side shall form a portion of a cell the thin walls whereof divide it from a corresponding cell partially formed by the next corrugation on the opposite side of the same plate, substantially as set forth.

2. A conveyer or conduit for wires or pipes, consisting of a series of plates or sheets of metal or analogous material bent or struck up to form alternately corrugations on their opposite sides and united together in pairs, so that a series of cells shall be formed between each united pair and the united pairs laid back to back, so that a series of cells shall be formed between the backs of such united pairs when laid in the conduit, substantially as and for the purpose set forth.

3. A conveyer or conduit for wires or pipes, consisting of a trough, A and A', the bolts $A^\times$, uniting the boards A A and lying inside of the boards A', and the plates or sheets B, constructed and arranged substantially as described, and having notches $a^{\times\times}$ in their edges in which the rods $A^\times$ rest, substantially as and for the purpose set forth.

In testimony whereof we affix our signatures in presence of two witnesses.

SYDNEY WM. ARNOLD.
WILLIAM C. CRANMER.

Witnesses:
FREDK. J. LAMBERT,
THOMAS D. MOULDS.